Dec. 8, 1925.

J. LAKE, JR 1,565,016

TANDEM ATTACHMENT

Filed March 25, 1925

Inventor
James Lake, Jr.
By his Attorney
Philip S. McLean.

Dec. 8, 1925.   1,565,016
J. LAKE, JR
TANDEM ATTACHMENT
Filed March 25, 1925   2 Sheets-Sheet 2
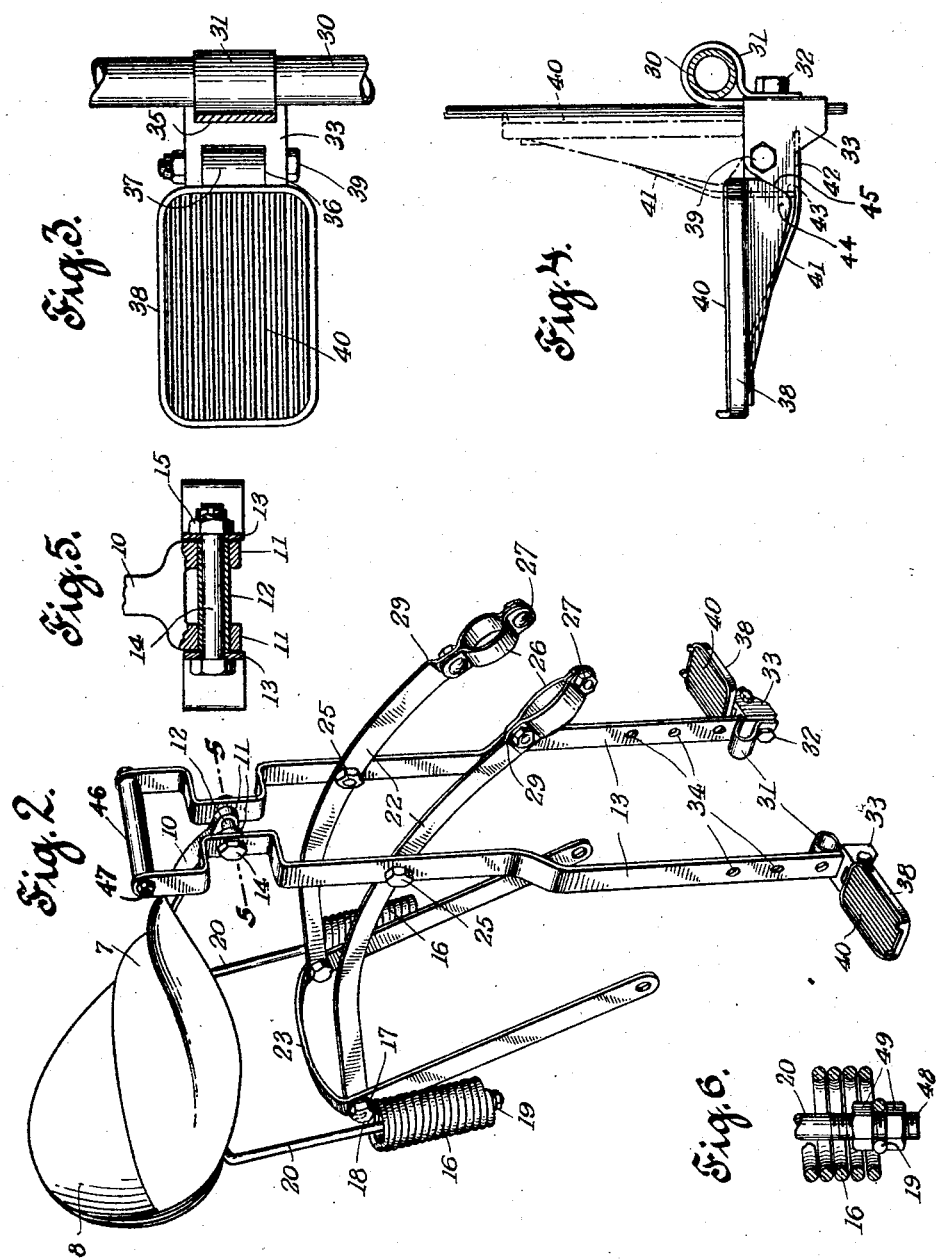
Inventor
James Lake, Jr.
By his Attorney
Philip S. McLean.

Patented Dec. 8, 1925.

1,565,016

UNITED STATES PATENT OFFICE.

JAMES LAKE, JR., OF BROOKLYN, NEW YORK.

TANDEM ATTACHMENT.

Application filed March 25, 1925. Serial No. 18,199.

*To all whom it may concern:*

Be it known that I, JAMES LAKE, Jr., a citizen of the United States, and a resident of Brooklyn, Kings County, and State of New York, have invented certain new and useful Improvements in Tandem Attachments, of which the following is a specification.

The present invention is a tandem attachment for motorcycles.

Special objects of the invention are to provide a tandem which can be quickly applied to a motorcycle or the like; which will be of light weight, but so constructed and braced that upon mounting on the machine it will be amply able to carry all the loads to which it may be subjected; which will be adjustable to meet various conditions, comfortable in its riding characteristics and entirely practical and desirable in every way.

Special features of the invention include the construction of the tandem with a frame attachable at three points on each side of the machine, the provision of such frame with uprights carrying a hand grip at the top and pedals at the bottom, adjustable to different leg lengths, the formation of the pedals to fold up out of the way against the uprights and the arrangement of the parts in a way enabling easy mounting of the tandem without bending or straining the attaching elements.

Various other novel features of the invention will appear as the specification proceeds.

In the drawings accompanying and forming part of this specification, a simple, practical embodiment of the invention is illustrated, in which:

Figure 2 is a detached perspective view of the tandem.

Figures 3 and 4 are broken plan and side views respectively of one of the pedals.

Figure 5 is an enlarged cross sectional view of the handle fork as on the line 5—5 of Figure 2, and Figure 6 is a fragmentary detail.

Figure 1:
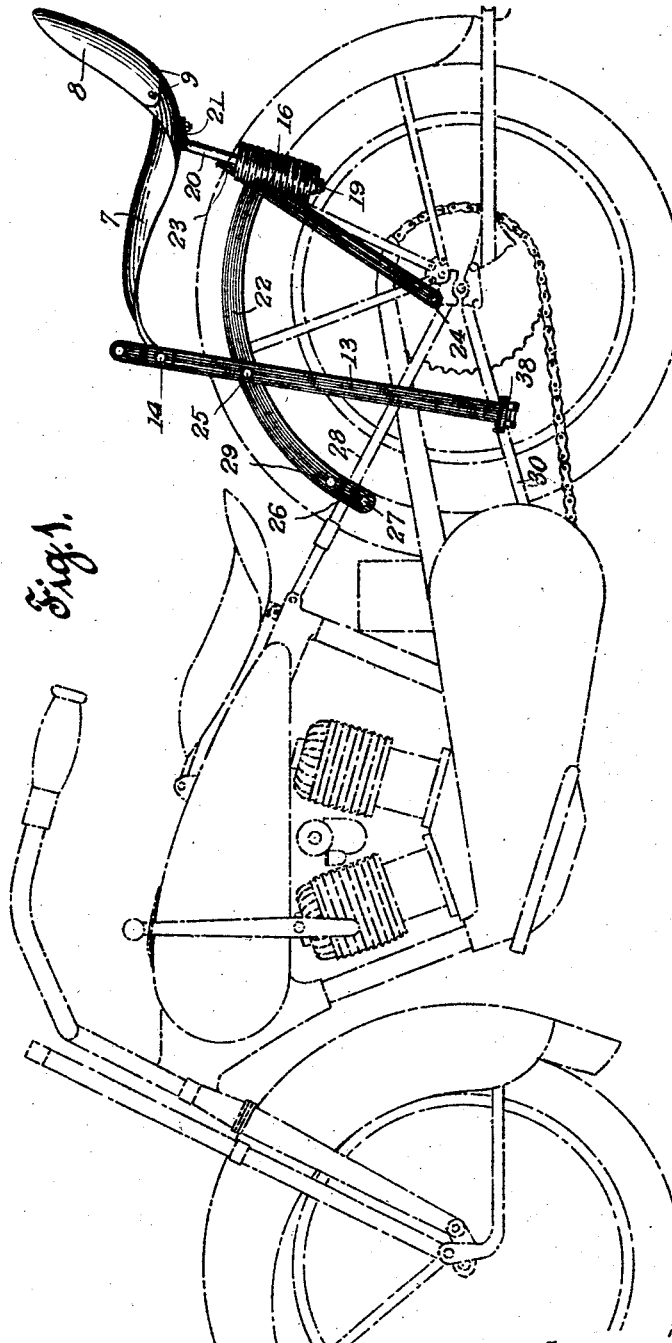
Figure 1 is a side view illustrating the method of attaching the tandem to the frame of a motorcycle.

The seat or saddle 7 may be of any special or approved design and is shown as having a back rest 8 removably attached by fastenings 9 and as having a pommel extension 10 with forked ends 11 pivotally engaged on a bushing 12. This bushing is shown in Figure 5 as serving as a spacer interposed between the uprights 13 which are held together at this point by a bolt 14 extended through the bushing. The sleeve 12 being of a length slightly greater than the width of the pommel fork, it will be seen that the tightening of the nut 15 on the end of the bolt will draw the uprights rigidly together without restraining the pivoting action of the seat.

At the rear the seat is resiliency supported by springs 16 having loops 17 at their upper ends held by the bolts 18 and having loops 19 at their lower ends engaged by the lower ends of the arch 20, which latter is connected to the seat by hinge loops 21.

The bolts 18 are utilized also as fastenings for securing the rearward ends of the curved side bars 22 to the top of a fork 23 which fits over the rear mudguard and is connected at its lower end at 24 to the rear fork of the motorcycle frame. These side bars are connected intermediate their ends by bolt fastenings 25 with the uprights 13 and at their forward ends they are equipped with clips 26 held by bolts 27 about the upwardly sloping braces 28 of the motorcycle frame. These frame bars 28 have a convergent as well as an upward inclination so the forward ends of the side bars 22 are twisted inwardly as indicated at 29 to bring the attaching clips into line with such convergence.

The lower ends of the uprights 13 are secured to the downwardly and forwardly extending bars 30 of the motorcycle frame by encircling clips 31 held by bolts 32. These same clip securing bolts 32 are used in the illustration to secure the pedal brackets 33. When the pedals are to be adjusted to other heights though, separate bolts will be used for securing the pedals, passed through openings 34 provided at selected heights in the uprights.

The pedal brackets shown are of special design, being forked at 35 to extend about the edges of the uprights and forked at 36 to receive pivot lugs 37 of the pedal frames 38. Bolts 39 secure the pedals in this pivoted relation. Rubber or other cushioning pads 40 may be engaged in the pedal frames.

To prevent the pedals from rattling and to hold them releasably in either the folded or extended relation, flat springs 41 are shown secured near the outer ends of the pedals and engaging at their inner free ends, either with the under side of the pedal brackets as at 42 in Figure 4, or with the ends of such brackets as at 43 in the same figure. In the first of these positions the springs hold the pedals extended in position for use with the inclined stop lugs 44 bearing upon and supported by the similarly inclined shoulders 45 on the supporting brackets. In the second of these positions, the pedals are yieldingly retained in position, folded flat up against the sides of the uprights. The upper ends of the uprights are shown as separated to receive between them, a tubular handle or grip 46 held in place by a through bolt 47 which rigidly clamps the ends of the uprights to the ends of such handle.

The inward inclination of the forward ends of the side bars permits the clips at these ends to be readily engaged about the convergent frame bars of the machine without bending or straining any of the parts and enables the frame to be quickly attached or detached. The attachment of the tandem frame at three points on each side of the machine braces the frame, prevents the frame from sagging or shifting and enables the making of the frame out of fairly light strip stock. The securing of the uprights together by two interposed spacing sleeves provides both a non-binding pivot for the saddle and a comfortable tubular grip for the rider. By adjusting the pedals to different positions on the uprights, the tandem may be readily suited to different riders.

In order that the saddle may be adjusted for heavier or lighter riders, the lower ends of the yoke 20 are shown in Figure 6 as screw threaded at 48 and with nuts 49 engaged thereon, between which the lower loops of the springs are held. It will be seen that by adjusting these nuts to different positions, the saddle may be raised or lowered so as to ride a heavier or a lighter person substantially at the same level and this adjustment also is desirable for different leg lengths.

What is claimed is:

1. A tandem attachment for motorcycles comprising a frame made up of side bars provided with clips at their forward ends angled to fit the upper convergent frame bars of a motorcycle, a yoke connected to the rearward ends of the side bars and adapted to have the lower ends of the same secured to the fork of the motorcycle frame, uprights having means at the lower ends of the same for attachment to the lower frame bars of a motorcycle, said uprights being secured to intermediate portions of the side bars and connected at the top by a spacer forming a hand grip and a saddle yieldingly supported at its rearward end and having its forward end pivotally supported between the uprights.

2. A tandem attachment for motorcycles comprising a frame made up of side bars provided with clips at their forward ends angled to fit the upper convergent frame bars of a motorcycle, a yoke connected to the rearward ends of the side bars and adapted to have the lower ends of the same secured to the fork of the motorcycle frame, uprights having means at the lower ends of the same for attachment to the lower frame bars of a motorcycle, said uprights being secured to intermediate portions of the side bars and connected at the top by a spacer forming a hand grip and a saddle yieldingly supported at its rearward end and having its forward end pivotally supported between the uprights, bolts securing the rearward ends of the side bars to the upper portion of the yoke, the yielding supports for the saddle comprising springs having their upper ends supported by said securing bolts.

3. A tandem attachment for motorcycles comprising a frame made up of side bars provided with clips at their forward ends angled to fit the upper convergent frame bars of a motorcycle, a yoke connected to the rearward ends of the side bars and adapted to have the lower ends of the same secured to the fork of the motorcycle frame, uprights having means at the lower ends of the same for attachment to the lower frame bars of a motorcycle, said uprights being secured to intermediate portions of the side bars and connected at the top by a spacer forming a hand grip, a saddle yieldingly supported at its rearward end and having its forward end pivotally supported between the uprights and pedals carried by the lower portions of the uprights.

4. A tandem attachment comprising side bars, means for securing the forward ends of the same to the upper frame bars of a motorcycle, a yoke secured to the rear ends of the side bars and adapted to have its lower ends secured at the rear fork of a motorcycle, uprights secured to the intermediate portions of the side bars, means for securing the lower ends of said uprights of the lower frame bars of a motorcycle, pedals carried by said uprights, a saddle pivoted at its forward end to the upper portions of the uprights and spring supports for the rearward end of the saddle.

5. A tandem attachment comprising upright bars provided with means at their lower ends for connection with the lower side bars of a motorcycle frame, side bars having means at their forward ends for engagement with the upper frame bars of a motorcycle, said side bars being secured intermediate their lengths to the upright bars, a yoke secured to the rear ends of the side bars and adapted for connection with the rear fork of a motorcycle frame and a carrying member supported from the side bars at the rear and supported at the front by the upwardly projecting portions of the upright bars.

6. In a tandem attachment, a frame comprising side bars, uprights connected with said side bars and having means at the lower ends of the same for connection with the lower frame bars of a motorcycle, a spacing sleeve secured between the upright bars at a point above the side bars, a seat pivoted on said spacing sleeve and a longer spacing sleeve secured between the side bars above the first spacing sleeve and forming a hand grip.

7. A tandem frame comprising uprights connected at their upper ends, side bars connected intermediate their ends with intermediate portions of the uprights, a yoke connected at its upper end with the rearward ends of the side bars, motorcycle frame engaging clips on the forward ends of the side bars, motorcycle frame engaging clips on the lower ends of the uprights, the yoke having means enabling attachment of the lower end of the same to the frame of a motorcycle whereby said tandem frame may be thus secured to the motorcycle frame at three points at each side of the same.

8. In combination with a supporting bar, a pedal bracket forked to fit about said supporting bar, a pedal pivoted to said bracket and a flat spring on the bottom of said pedal and having a free portion engaging the bracket to yieldingly retain the pedal either extended or folded up against the side of the supporting bar.

9. A tandem frame comprising uprights connected at their upper ends, side bars connected intermediate their ends with intermediate portions of the uprights, a yoke connected at its upper end with the rearward ends of the side bars, motorcycle frame engaging clips on the forward ends of the side bars, motorcycle frame engaging clips on the lower ends of the uprights, the yoke having means enabling attachment of the lower end of the same to the frame of a motorcycle whereby said tandem frame may be thus secured to the motorcycle frame at three points at each side of the same, a saddle pivotally supported at its forward end by the connected upper end portions of the uprights and yielding supporting means for the rearward end of the saddle connected at the junction of the rearward ends of the side bars with the upper end of the yoke.

In witness whereof, I have hereunto set my hand this 10th day of March, 1925.

JAMES LAKE, Jr.